INVENTOR
JAMES G. McCALLUM
BY Toulmin & Toulmin
ATTORNEYS

INVENTOR
JAMES G. McCALLUM
BY *Toulmin & Toulmin*
ATTORNEYS

INVENTOR
JAMES G. McCALLUM
BY
ATTORNEYS

INVENTOR
JAMES G. McCALLUM

July 20, 1965 J. G. McCALLUM 3,195,395
FIBER METALLIZING APPARATUS AND METHOD FOR MAKING
SHIELDED ELECTRICAL CONDUCTORS
Filed Feb. 1, 1963 7 Sheets-Sheet 7

INVENTOR.
JAMES G. McCALLUM
BY Toulmin & Toulmin
ATTORNEYS

United States Patent Office 3,195,395
Patented July 20, 1965

3,195,395
FIBER METALLIZING APPARATUS AND METHOD FOR MAKING SHIELDED ELECTRICAL CONDUCTORS
James G. McCallum, New York, N.Y., assignor to The Commonwealth Engineering Company of Ohio, Dayton, Ohio
Filed Feb. 1, 1963, Ser. No. 256,212
3 Claims. (Cl. 87—1)

This application is a continuation-in-part of Serial No. 698,245, filed Nov. 22, 1957, which is now abandoned.

This invention relates to the mechanical protection and electrical shielding of wire and cable designed for electrical use; more particularly the invention relates to the production of shielded electrical conductors and to equipment for the attainment of such production on a commercial basis.

In present practice both mechanical and electrical shielding for wire and cable are constituted by fine wire, metal foils, or impregnated fabrics, tapes and yarns; the impregnant of these latter materials is usually graphite or a metal powder. Difficulty is encountered with the fine wire and metal foil, particularly in respect to adequate bonding with some materials; other difficulties are inherent to the graphite or powder impregnated materials as such impregnants not only dust off in the course of manufacturing operations, but also flake off in use, particularly when the wire or cable is subjected to a flexing stress.

Customarily also the impregnant is provided on an organic fibrous material, such as cotton; this is objectionable because of bulkiness which tends to increase the outside diameter of the cable, because the organic fibers deteriorate under elevated temperature, and because segregation of the impregnant material tends to occur in the fiber interstices resulting in poor flexing qualities and further segregation of the impregnant under flexing conditions of use.

Bonding of the customary shielding materials to silicone rubber insulation which is now attaining a prominent position in the industry has also given rise to numerous problems.

This invention contemplates the provision of a system for the production of materially improved protected and shielded electrical conductors. Such system is arranged to produce metallized fiber tapes, strands or yarns in a facile manner, which in the operation of the equipment is braided directly onto an insulated electrical conductor in a continuous manner if so desired.

An important object of the invention is the provision of a method and apparatus for making an electrical conductor having a protecting and shielding braid of metallized fibers enclosing the conductor; such metallized fibers in the practice of the invention preferably are constituted of glass fibers having a thin coating of a metal such as nickel or iron. Glass fibers are preferred as they are subject to production metallizing, without breaking or fraying in the passage of the metallizing equipment, do not deteriorate in the heat to which electrical equipment is subject, do not deteriorate under storage conditions, do not suffer a loss of tensile strength in the metallizing process, lose no flexibility on metallizing, and are thoroughly adapted for the braiding process which follows the metallizing operation. The glass fibers are suitably in the form of yarns, tapes or strands.

The invention will be more fully understood by reference to the following detailed description and accompanying drawings wherein:

FIGURE 1 is a view in front elevation illustrating an equipment arrangement for the practice of the invention;

FIGURE 2 diagrammatically illustrates an equipment arrangement similar to that of FIGURE 1 and with control devices indicated;

Figure 12:
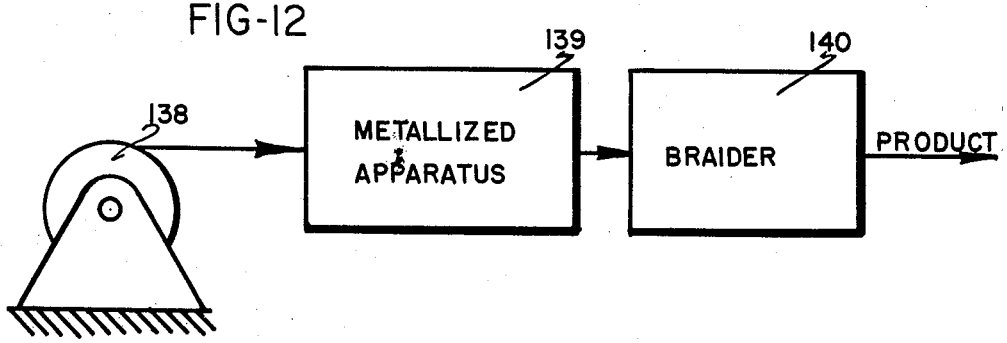
Figure 13:
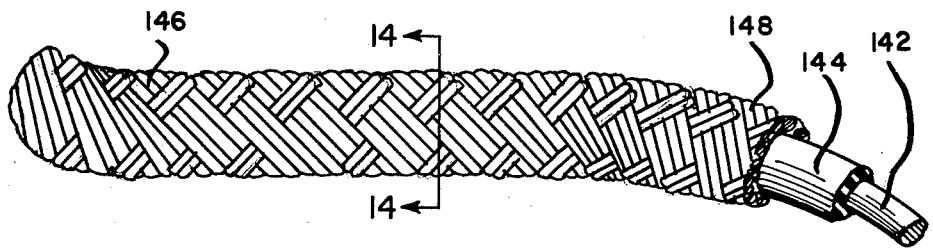
Figure 14:
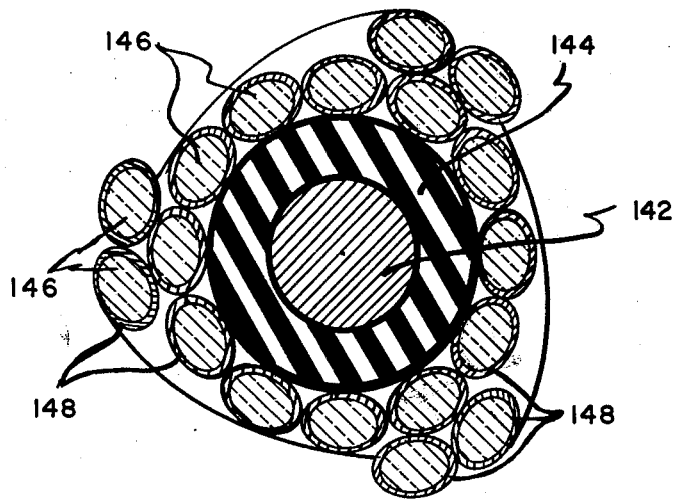

FIGURE 12 schematically illustrates a combination of plating equipment with a braiding machine;

FIGURE 13 is a view of a braided conductor in accordance with the invention; and FIGURE 14 is a sectional view taken on line 14—14 of FIGURE 13.

Referring to the drawings more in detail, the numeral 1 indicates a tank source of a liquid carbonyl, such as nickel carbonyl; the tank source is tiltably supported in any suitable manner as by tackles 3 for causing flow of the carbonyl toward the conduit 5 connected to the tank source 1. Conduit 5 is conveniently valved at 7 for controlling flow of liquid carbonyl to vaporizer 9.

The numeral 10 designates a source of a carrier gas (carbon dioxide) for use in conjunction with the plating gas; carbon dioxide, nitrogen, argon or inert gases, generally may be utilized for this purpose. Source 10 is provided with a pressure gauge 11, and is connected to conduit 12 through valve 13.

Figure 7:
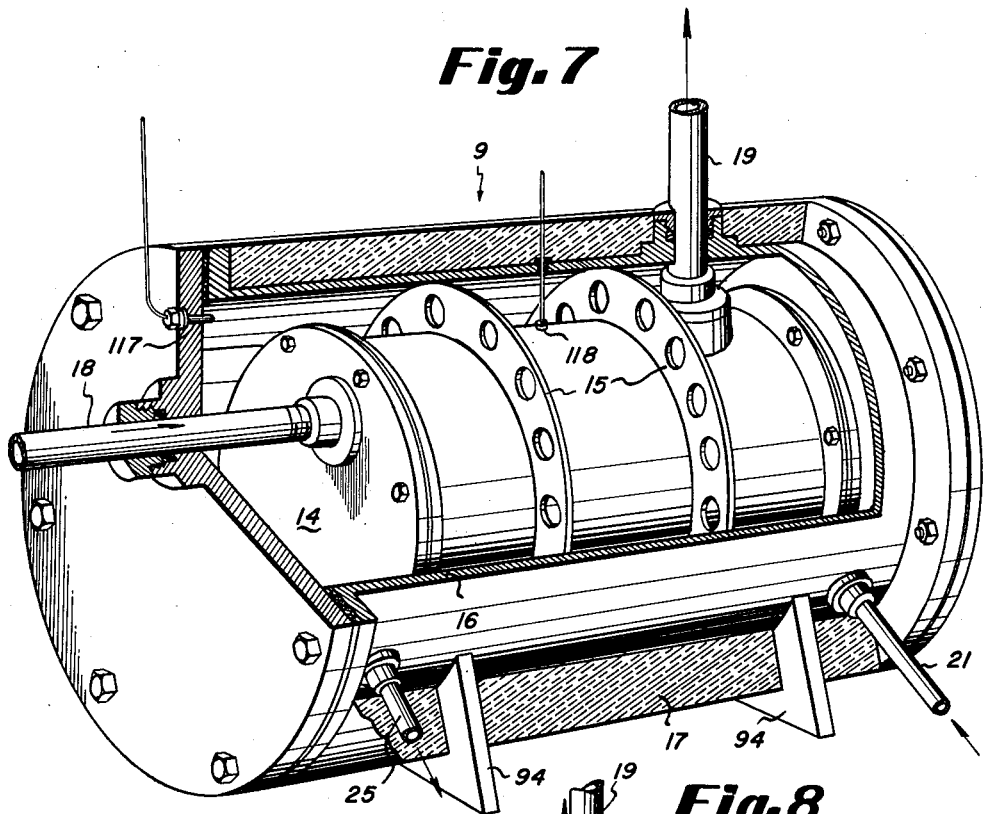
FIGURE 7 is a perspective view with portions broken away illustrating a vaporizer arrangement for supplying plating gas to the plating chamber of the arrangement of FIGURE 1.
Figure 8:
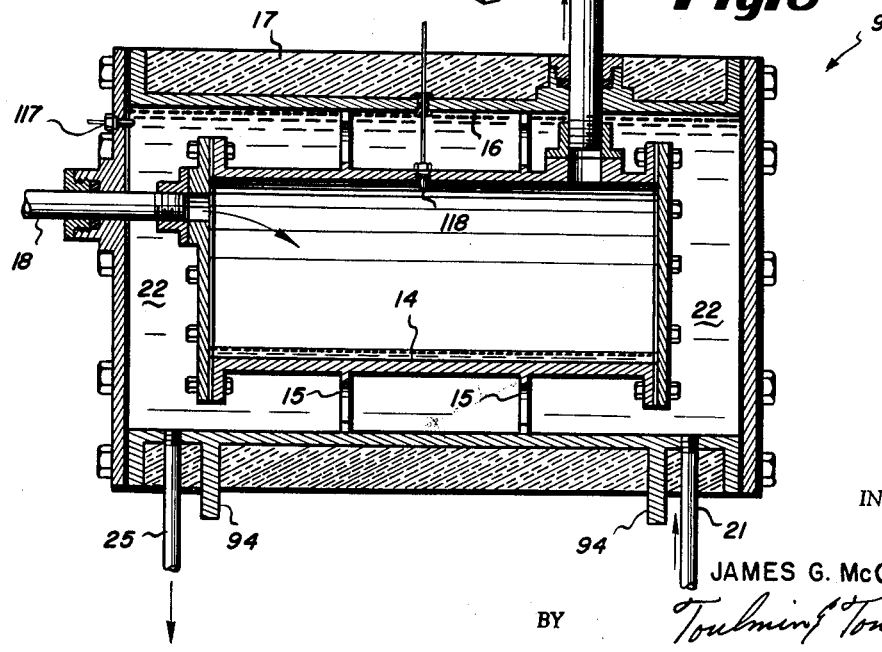
FIGURE 8 is a longitudinal sectional view of the vaporizer of FIGURE 7.

The vaporizer 9 is most clearly shown in FIGURES 7 and 8 and comprises a suitable internal cylinder 14 supported by circumferential flanges 15 in spaced and sealed relation with an outer cylinder 16. Cylinder 16 in effect forms a hot water jacket about cylinder 14 of the vaporizer and is itself suitably insulated, as at 17.

An inlet conduit 18 formed by the juncture of conduits 5 and 12 carries the carbonyl and the carrier gas to the cylinder 14; conduit 18 passes in sealed relation (FIGURE 8) through a wall of cylinder 16 to cylinder 14 and an outlet conduit 19 from the cylinder 14 passes in sealed relation through an upper portion of cylinder 16. Hot water surrounding the cylinder 14 occasions vaporization of the carbonyl and the combination of carrier gas and nickel carbonyl is pressured outwardly of the vaporizer to the equipment plating chambers to be described hereinafter.

The numeral 20 designates a water heater connected by an inlet conduit 21 with the spacing 22 between the cylinders 14, 16; a pump 23 driven by motor 24 is directly in the conduit 21. Return line 25 connects spacing 22 with heater 20.

Conduit 19 (FIGURES 1 and 2) communicates with a header 26 from which inlet branch conduits 27 containing hand valves 28 lead to a plurality of plating chambers 29; each plating chamber is essentially a hollow tube from which an exhaust line 30 leads to an exhaust header 31.

Figure 6:
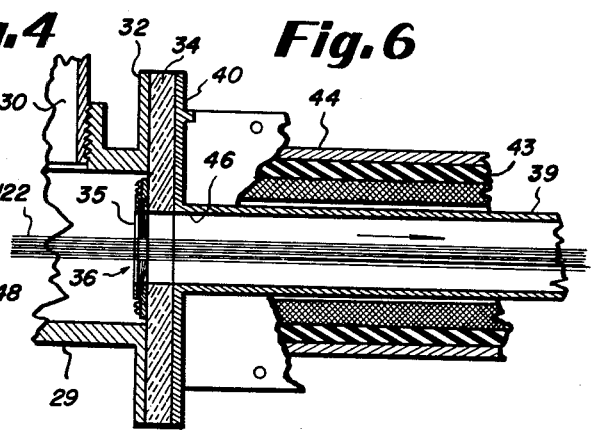
FIGURE 6 is a fragmentary view of structure shown in FIGURE 3 with portions broken away and particularly illustrating a plating chamber-heater junction.
Figure 5:
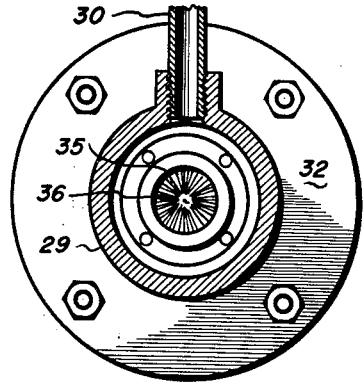
FIGURE 5 is a view taken on line 5—5 of FIGURE 3.

Each plating chamber 29 is provided with end flanges 32, 33 which abut against a body of heat insulating material 34, as shown most clearly in FIGURE 6. Each flange-heat insulation material combination is provided with an aperture 35 therethrough and this aperture is, in each instance, provided with a barrier 36 of flexible bristles—as nylon bristles—to inhibit gas flow outwardly of the plating chamber through the aperture.

A flow meter 37 is suitably provided in the conduit 19.

Preceding each plating chamber 29 is a heater 38 comprised (FIGURE 6) of a metal tube 39 flanged at 40, 41 and abutting the heat insulation material 34. Electrical resistance heater elements (FIGURE 6) surround the tube 39 which is itself provided with a body of heat insulation material 43 which extends over the tube length. The heat insulation material is protectively enclosed by a metal shell 44 flanged on opposite sides at 45. As will be noted, the shell 44 is in two sections bolted together at the flanges and is readily disassembled for repairs should such be necessary. Apertures 46 (see FIGURE 6) in the end flanges communicate with the apertures 35, the insulation material 34 and plating chambers.

Figure 3:
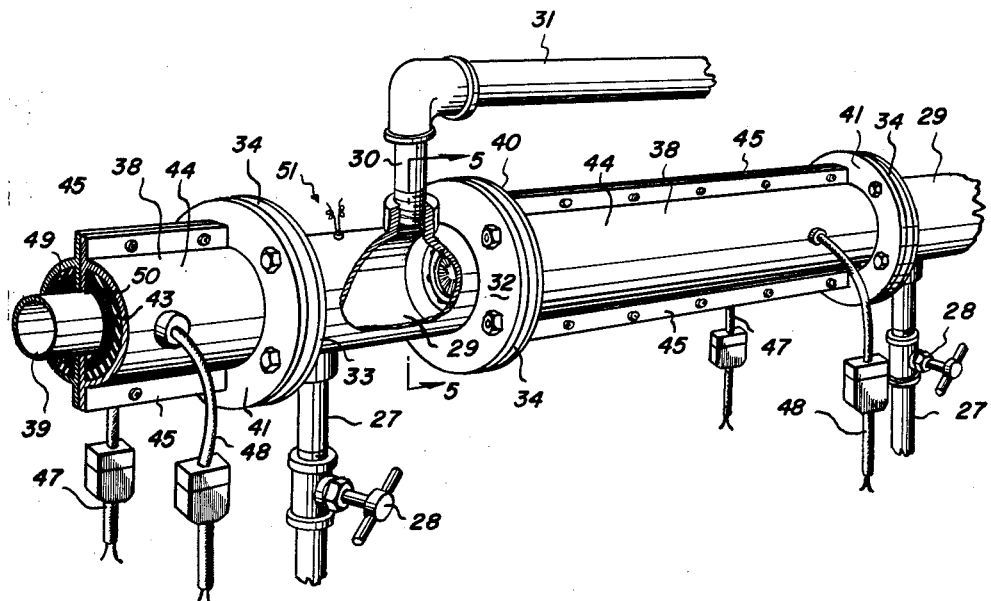
FIGURE 3 is a fragmentary and perspective view of a portion of the apparatus shown in FIGURE 1 and particularly illustrating a heater and gas plating chamber combination.
Figure 4:
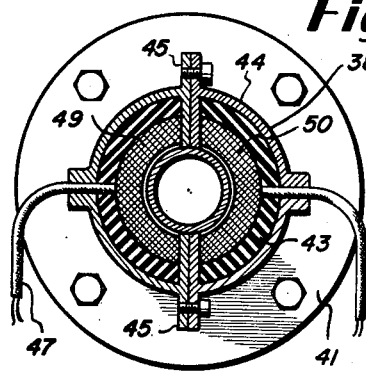
FIGURE 4 is a left hand end view of the structure of FIGURE 3.

The electrical leads to the heating elements are designated at 47, 48 (FIGURE 3) and the elements are designated at 49, 50 (FIGURE 4).

Figure 2:
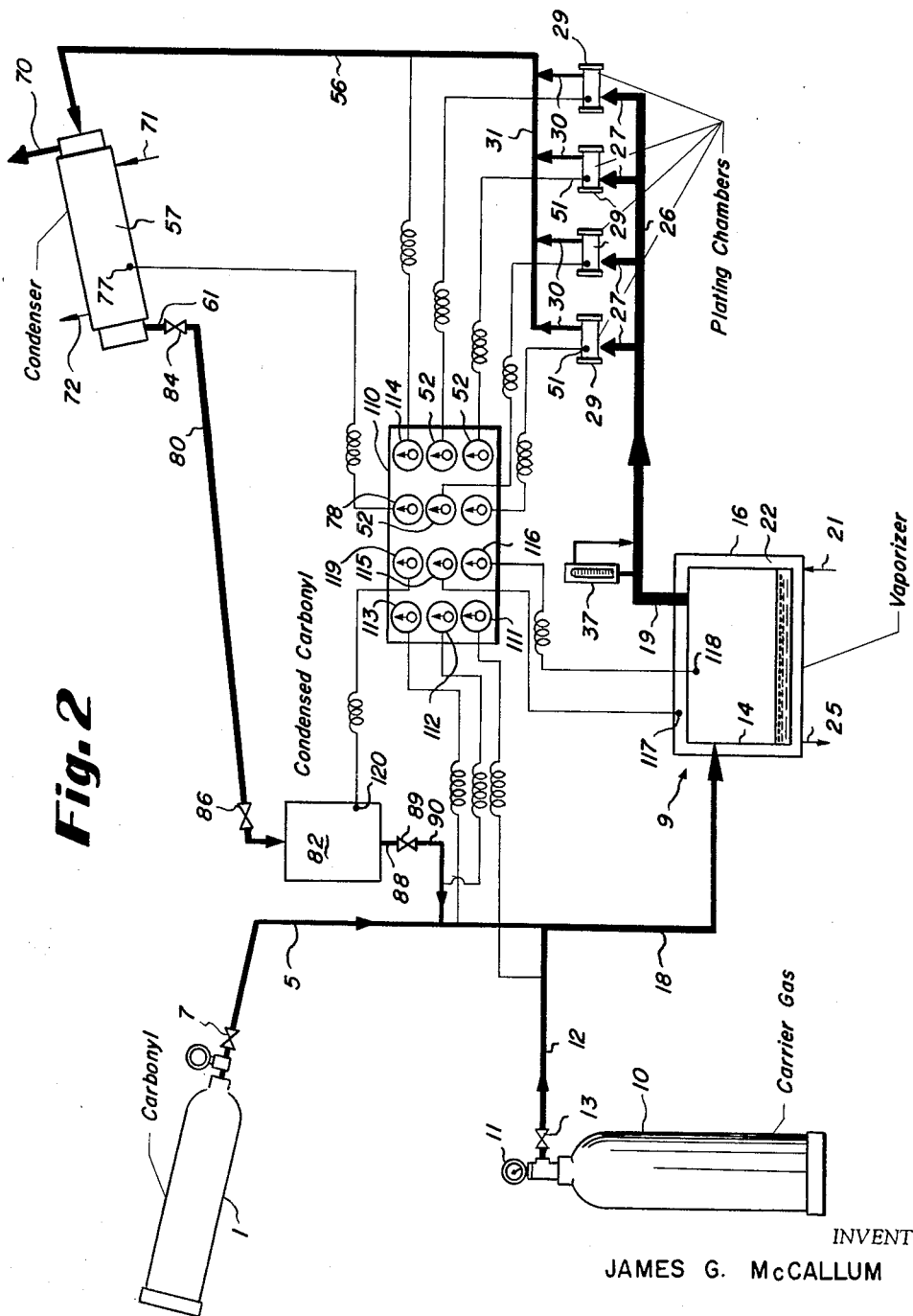
Figure 11:
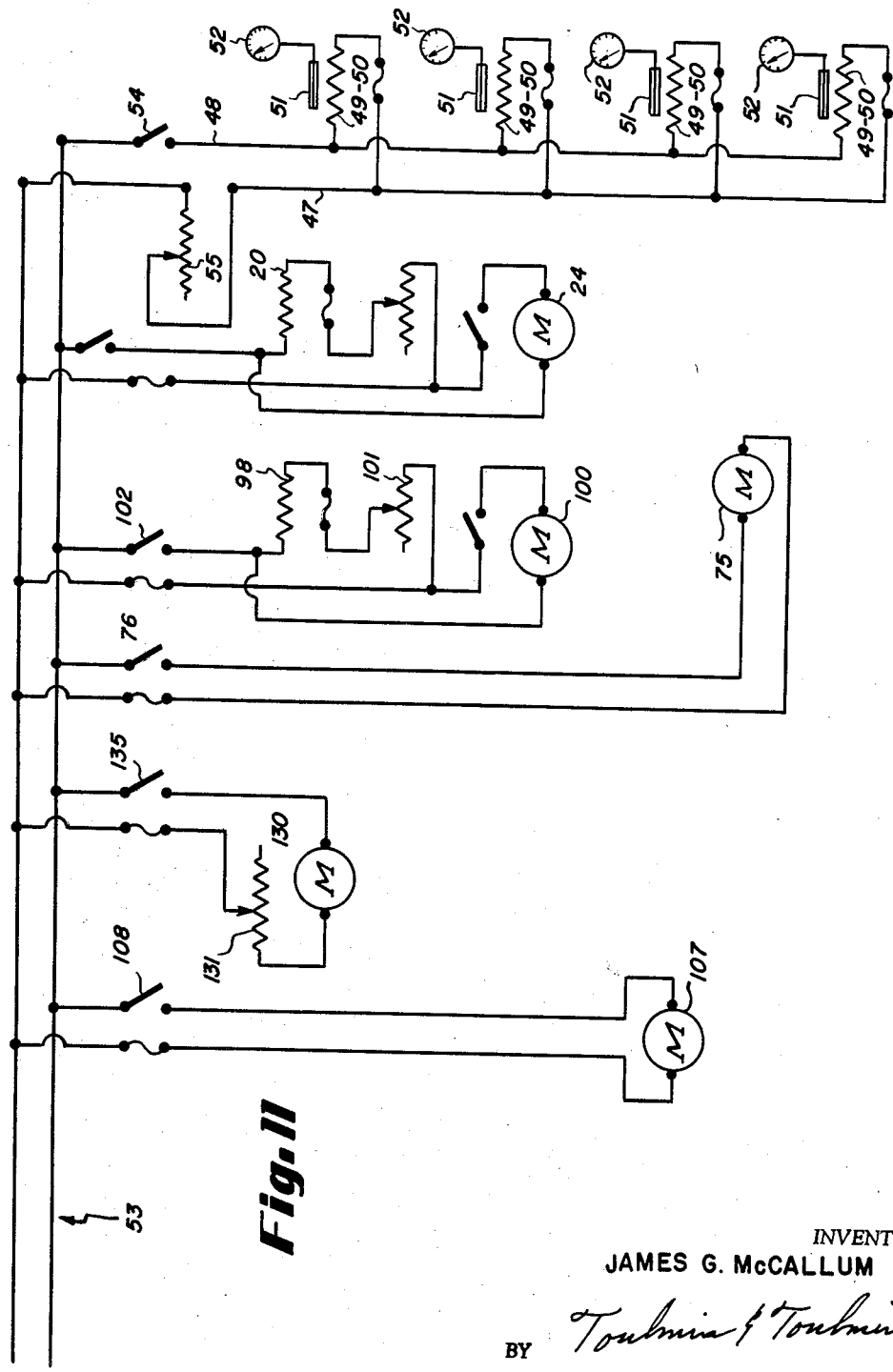
FIGURE 11 is a diagrammatic view indicating a wiring arrangement for devices illustrated in FIGURE 1.

Thermocouples, the leads of which are shown at 51 in FIGURE 3 are provided and are associated with gauges 52 (FIGURE 2); as will be noted from FIGURE 2 individual temperature indication for each heater is provided. As seen in FIGURE 11, where the indicating elements are shown schematically, the heaters are connected to the power line 53 through switch 54 and the heater circuit includes regulator 55.

Figure 9:
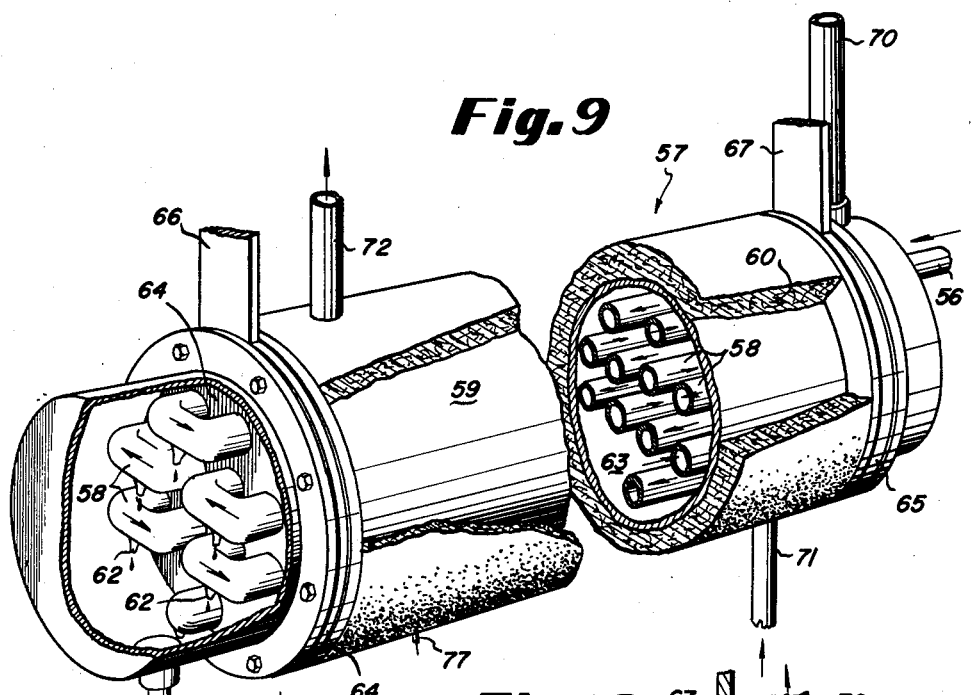
FIGURE 9 is an exploded view in perspective and with parts broken away illustrating a condenser for recovering gas plating material.
Figure 10:
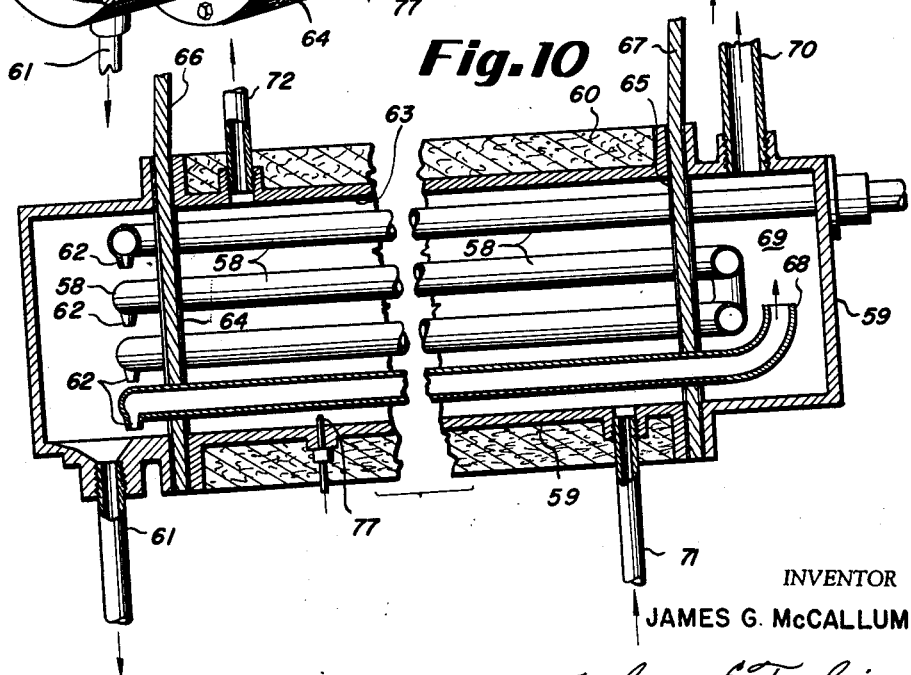
FIGURE 10 is a longitudinal sectional view of the structure of FIGURE 9.

Exhaust gases entering the header 31 pass to vertical conduit 56 and to condenser 57. Condenser 57 comprises (FIGURE 10) reversely bent tubing 58 which provides a long flow path for material to be condensed from the exhaust gases of the plating chamber. The tubing is within a casing 59 insulated as at 60, and the tubing and casing incline slightly to provide for flow of condensed material—that is plating carbonyls, for example—outwardly through conduit 61 of the casing. For this purpose the lower tubing end is provided with a plurality of outlets 62 to the interior of the casing (FIGURES 9 and 10). Coolant courses through the spacing 63 which contains the majority of the tubing length and is formed by partitions 64, 65 (FIGURES 9 and 10). Partitions 64, 65 are respectively provided with tongues 66, 67.

Tubing 58 terminates in an open end 68 in spacing 69 and the uncondensed gases pass to an exhaust conduit 70.

Coolant is provided to spacing 63 through inlet pipe 71 and is exhausted through outlet pipe 72. A refrigeration unit indicated at 63 (FIGURE 1) and including a pump 74 and motor 75 provides for circulation of the coolant. Water is a suitable coolant for the carbonyls such as nickel and iron. Motor 75 (FIGURE 11) is suitably connected through switch 76 to the power line.

Coolant temperature is indicated by a thermocouple at 77 connected to gauge 78 (FIGURE 2).

Figure 1:
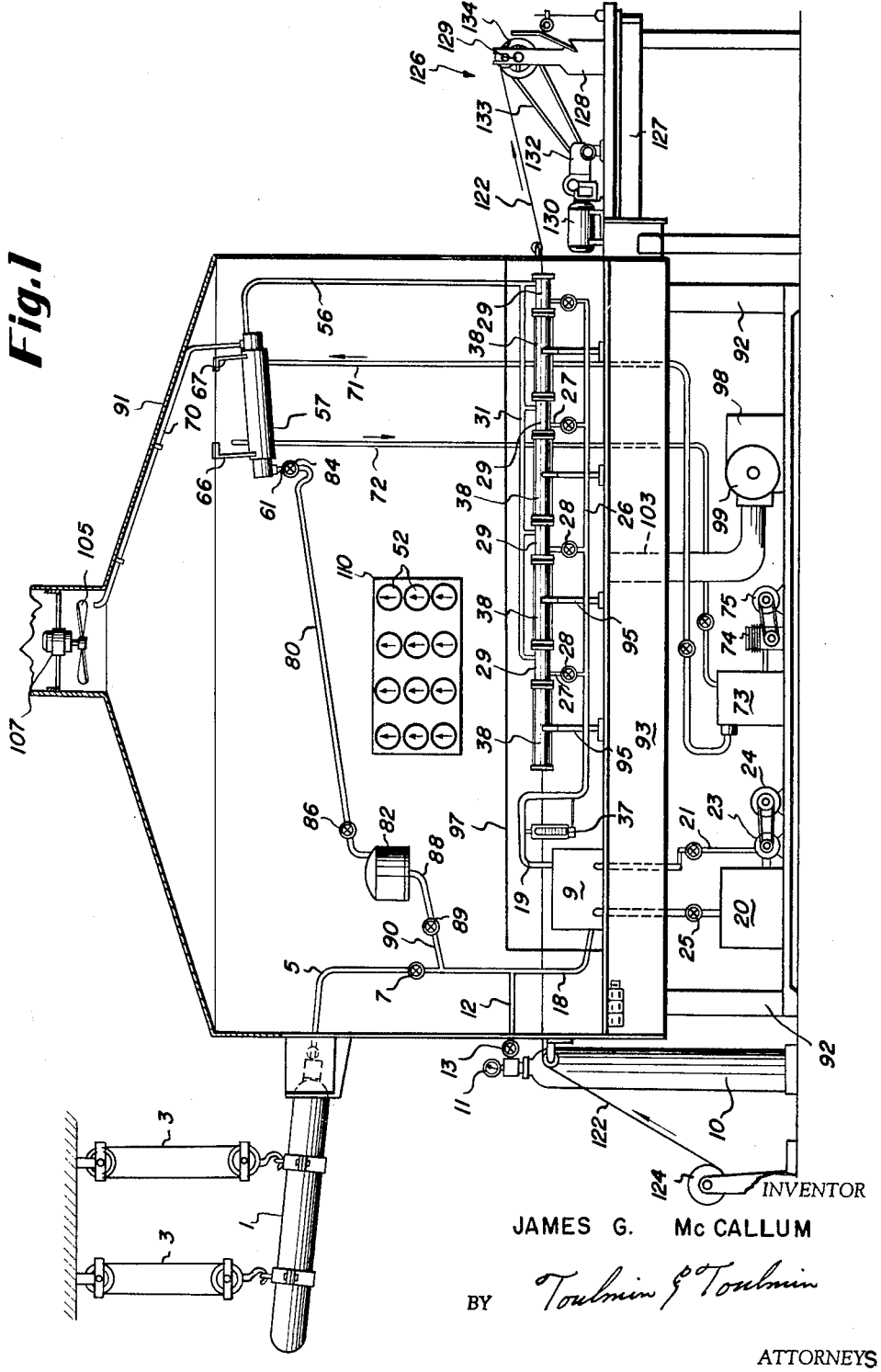

Condensed carbonyl flows through conduit 80 to a storage tank 82 through valves 84, 86. The outlet line 88 of tank 82 communicates through valve 89 in conduit 90 with conduit 5, (FIGURE 1).

Hood 91 is provided to enclose a major portion of the equipment and is itself suitably supported on legs 92. Table 93 of the hood receives supports 94 of the vaporizer (FIGURE 7) and supports 95 (FIGURE 1) for the heating and plating chamber combinations.

The hood is provided with a glass cover section 97 for housing the vaporizer, and heating and plating chambers. The temperature within this housing 97 is controlled by flowing heated air through the housing. For this purpose an air heater 98, blower 99 and motor 100 are provided (FIGURE 11), together with a control 101 for the heater. Switch 102 connects the heater and controls with power line 53. Conduit 103 conducts the air to the housing 97. The housing is not itself completely airtight and spent air leaks readily therefrom.

Hood 91 is suitably provided with an exhaust fan 105 driven by motor 107 (FIGURE 11) which is energizable from the power line through switch 108. Thus gases emanating through exhaust conduit 70 which terminates in the upper portion of the hood 91 are readily passed to waste.

Gauges on an indicator board 110 provide for pressure and temperature indications to permit control. Reference has already been made to temperature gauges 52 and 78. Pressure gauges (FIGURE 2) 111, 112, 113 and 114 respectively, indicate the pressures in conduits 12, 90, 7 and 56. Gauge 115 indicates the temperature of the vaporizer water and gauge 116 indicates vaporizer pressure, the former being connected to a thermocouple at 117 and the latter being connected to tank 14 at 118. Pressure gauge 119 is connected to storage tank 82 at 120.

The material to be metallized enters hood 1 from the left (FIGURE 1). This material may comprise a single strand but more generally includes a considerable plurality of strands, as indicated at 122 in FIGURE 6. The direction of strand travel is indicated by the arrow (FIGURE 6).

Glass fiber material to be plated then is wound on reels at 124 and passed through the hood and the apertures of the heating and plating chambers to the takeup 125 (FIGURE 1) at the outer side of the hood. This takeup structure 126 includes a support 127 having upstanding arms 128 which receive therebetween a shaft 129 for rotation, one such arm being shown in FIGURE 1. Motor 130 controlled by a rheostat arrangement 131 (FIGURE 11) through gear box 132 and belt 133 drives shaft 129 and reel means 134 secured thereon. Switch 135 (FIGURE 11) provides for energizing motor 130 from the power line.

Under typical operative conditions the glass fiber, whether in tape or yarn form, may be drawn through the apparatus at a speed of about 100 feet per minute.

Such operative conditions employing nickel carbonyl include operation at pressure from very low vacuum up to atmospheric, thus a pressure within the plating area of 30–40 mm. is suitable. The temperature also may be chosen over a wide range but for nickel carbonyl, 250–275° F. is suitable.

While particular reference has been made to glass fibers other inorganic fibers should display similar characteristics, particularly the siliceous fibers including asbestos. Glass fibers generally are somewhat less bulky than the asbestos and less conductive electrically than asbestos, and accordingly are preferred.

It is to be particularly noted that with glass fibers very little breakage occurs in the metallizing equipment, and accordingly there is substantially no penetration of the insulation about the conductive wire. Such penetration sometimes occurs with metal wires. Further, the avoidance of breakage in the metallizing process as described is beneficial in the braiding procedure, since there is no interference with the operation of the braider.

The apparatus for metallizing has been described in detail as it is particularly adapted to provide metallized fibers of high uniformity, substantially free of breakage and fraying, and which fibers retain their original flexibility and tensile strength.

To provide a fiber or filament of metallized glass which exhibits substantially the same flexibility and tensile strength as the original unmetallized fiber, the gas plating metal deposit must be of uniform thickness and not thicker than about 0.00001 of an inch; a minimum and maximum range of 0.000001 to 0.00001 of an inch respectively is preferred. Metal thickness above or below this range does not produce an electrical conductor having the improved flexibility characteristic properties as produced in accordance with the present invention. The glass fibers employed have an average diameter of about 0.0003 of an inch. The resultant glass fibers after being metallized by gas plating have an over-all diameter of about 0.000305 of an inch. These metallized fibers even when coated with iron from iron pentacarbonyl rather than the nickel may be stored for long periods of time without deterioration. Thus they retain through a long life, it has been found, those qualities which adapt them for braiding.

The apparatus is also suitable for the passage of an already braided insulated conductor and it appears that metallizing such insulated glass covered conductor would be as efficient as metallizing the fibers first and then effecting the braiding.

Now referring to FIGURE 12, the numeral 138 indicates a reel from which the fibers may be passed to the metallizing apparatus 139 and then continuously to a standard braider 140. In the braiding operation the shielding material may be applied to a conductor insulated with resin, for example. Alternatively, one deck of a braider may be employed to feed insulation in the form of glass fibers, while the other deck is used to feed the shielding material in the form of metallized glass fibers.

FIGURE 13 illustrates the flexibility of the finished product wherein 142 designates copper wire surrounded by insulation 144 and over which the metallized fibers 146 are braided (FIGURE 14), the metal being indicated by the numeral 148.

The product (FIGURES 13 and 14) avoids bulkiness, flexes well and is resistant to temperature. The metal is suitably extremely thin merely sufficient to coat the fibers but has been indicated in FIGURE 14 to be of some thickness for the sake of clarity. The metal may, of course, be deposited in a heavy layer if such is desirable, but for most braided wire applications a very thin coat is suitable. Such metal is adherent, does not flake, or dust, and being itself quite pure, resists oxidation.

The product of the invention is particularly designed for the protection of ignition and high tension lines in the aircraft and automotive fields, as well as aircraft wiring and electronic equipment. Thus the retention of flexibility is an important consideration and renders the glass fibers when metallized of particular utility for such applications.

Metallized glass fibers having the very thin coating of metal, and such as deposited evenly and uniformly on the fibers may be applied as an outer flexibile shield to rubberized wire cables, and the like, to provide a very durable shielded electrical conductor or cable. Glass fibers are preferably made up of filaments of glass each of which is metallized, the glass fiber being braided about the rubber or plastic electrical insulation applied on the wire core.

Further, as heretofore pointed out, it is essential that the thickness of the metal deposit on the fibers or filaments be controlled so that the flexibility of the metallized fibers will not be impaired and remain substantially unchanged from that of the original fiber or filament.

In this connection it is to be noted that the fibers when metallized tend less toward breakage and are readily handled by the braider, probably because the surrounding metal film of each of the filaments of the glass reduces friction and provides a sheath inhibiting breakage.

It will be understood that this invention is susceptible to modification in order to adapt it to different usages and conditions and accordingly, it is desired to comprehend such modifications within this invention as may fall within the scope of the appended claims.

What is claimed is:

1. A process which comprises metallizing glass fibers with metal deposited from a gaseous metal carbonyl by passing the fibers through the carbonyl while the fibers are heated to the decomposition temperature of the carbonyl, and continuing the movement of the metal coated fibers to an insulated conductor on a standard braider, and braiding the metal coated fibers on the insulated conductor.

2. In combination, metallizing apparatus for continuous lengths of fibers, and braiding apparatus for braiding substantially continuous lengths of fibers about a conductor arranged to receive the continuous lengths of fibers from the metallizing apparatus for braiding, said metallizing apparatus having means for depositing a coating metal on said lengths of fibers from a heat decomposable gaseous metal bearing compound.

3. The combination of fiber metallizing apparatus for depositing a layer of metal having a thickness of not greater than 0.00001 inch on continuous lengths of fibers to form metallized fibers, and a braider which is adapted to receive said metallized fibers from said apparatus and for braiding said metallized fibers on an insulated conductor.

References Cited by the Examiner

UNITED STATES PATENTS

| | | | |
|---|---|---|---|
| 2,257,649 | 9/41 | Pierce | 87—1 |
| 2,293,677 | 8/42 | Slayter. | |
| 2,344,181 | 3/44 | Stone. | |
| 2,658,014 | 11/53 | Morrison | 156—51 |
| 2,663,752 | 12/53 | Wier | 174—36 |
| 2,749,255 | 6/56 | Nack et al. | |
| 2,791,515 | 5/57 | Nack. | |
| 2,810,669 | 10/57 | Heupgen | 156—51 |
| 2,848,390 | 8/58 | Whitehurst et al. | |
| 2,862,783 | 12/58 | Drummond | 117—107.2 X |
| 2,867,552 | 1/59 | Homer | 117—107.2 X |
| 2,887,088 | 5/59 | Nack | 117—107.2 X |
| 3,051,771 | 8/62 | Lee | 174—36 |

FOREIGN PATENTS 573,002   11/45   Great Britain.

MERVIN STEIN, *Primary Examiner.*

JOHN P. WILDMAN, *Examiner.*